United States Patent
Brugue Garvi et al.

(10) Patent No.: US 10,391,771 B2
(45) Date of Patent: Aug. 27, 2019

(54) PRINT BAR

(71) Applicants: Hewlett-Packard Development Company, L. P., Houston, TX (US); Joaquim Brugue Garvi, Sant Cugat del Valles (ES); Rafael Ulacia Portoles, Sant Cugat del Valles (ES); Daniel Gonzalez Perello, Sant Cugat del Valles (ES); Eduardo Ruiz Martinez, Sant Cugat del Valles (ES); Francesc Roure Pastor, Sant Cugat del Valles (ES)

(72) Inventors: Joaquim Brugue Garvi, Sant Cugat del Valles (ES); Rafael Ulacia Portoles, Sant Cugat del Valles (ES); Daniel Gonzalez Perello, Sant Cugat del Valles (ES); Eduardo Ruiz Martinez, Sant Cugat del Valles (ES); Francesc Roure Pastor, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/748,567

(22) PCT Filed: Oct. 30, 2015

(86) PCT No.: PCT/EP2015/075301
§ 371 (c)(1),
(2) Date: Jan. 29, 2018

(87) PCT Pub. No.: WO2017/071774
PCT Pub. Date: May 4, 2017

(65) Prior Publication Data
US 2018/0264817 A1    Sep. 20, 2018

(51) Int. Cl.
*B41J 2/155* (2006.01)
*B23C 3/13* (2006.01)

(52) U.S. Cl.
CPC .............. *B41J 2/155* (2013.01); *B23C 3/13* (2013.01); *B23C 2226/61* (2013.01); *B41J 2202/19* (2013.01)

(58) Field of Classification Search
CPC ........... B41J 2/15; B41J 2/155; B41J 2202/20
(Continued)

(56) References Cited

U.S. PATENT DOCUMENTS

| 5,408,746 A | 4/1995 | Thoman et al. |
| 5,734,394 A | 3/1998 | Hackleman |

(Continued)

FOREIGN PATENT DOCUMENTS

| CN | 1968819 | 5/2007 |
| CN | 102971151 | 3/2013 |

(Continued)

*Primary Examiner* — An H Do
(74) *Attorney, Agent, or Firm* — HP Inc. Patent Department

(57) ABSTRACT

Provided is a print bar. The print bar comprises a reference element to align the print bar with a mounting structure of a printer. The print bar further comprises a flat elongate sheet metal portion with constant height whose length is larger than its width and whose width is larger than its height. Moreover, the print bar comprises a plurality of plastic members detachably mounted to a mounting surface of the flat elongate sheet metal portion. The plurality of plastic members is spaced apart from each other in the length direction.

13 Claims, 2 Drawing Sheets

(58) Field of Classification Search
USPC .................................................. 347/40, 49
See application file for complete search history.

(56) References Cited

U.S. PATENT DOCUMENTS

| | | |
|---|---|---|
| 6,428,141 B1 | 8/2002 | McElfresh et al. |
| 6,471,335 B1 | 10/2002 | Gelbart |
| 9,604,459 B2 * | 3/2017 | Elliot ........................ B41J 2/145 |
| 2002/0030718 A1 | 3/2002 | Kline et al. |
| 2002/0148091 A1 | 10/2002 | Tran et al. |
| 2010/0289854 A1 | 11/2010 | Hagiwara et al. |
| 2012/0019593 A1 | 1/2012 | Scheffelin et al. |
| 2015/0062245 A1 | 3/2015 | Dowell |

FOREIGN PATENT DOCUMENTS

| | | |
|---|---|---|
| CN | 104384581 | 3/2015 |
| EP | 0666174 | 8/1995 |
| EP | 1728642 | 12/2006 |
| GB | 2449939 | 12/2008 |
| WO | WO-0164441 | 9/2001 |

* cited by examiner

PRINT BAR

To achieve high quality results in multi-print head printers, the print heads have to be accurately positioned relative to each other and relative to the print medium. To achieve this, the print heads can be mounted on a solid print bar of a length that corresponds to the width of the print medium and is arranged to traverse the print medium feeding path. However, the manufacturing of print bars that meet the positioning precision can be demanding.

BRIEF DESCRIPTION OF DRAWINGS

The following detailed description refers to the appended drawings in which.

DETAILED DESCRIPTION

Figure 1:
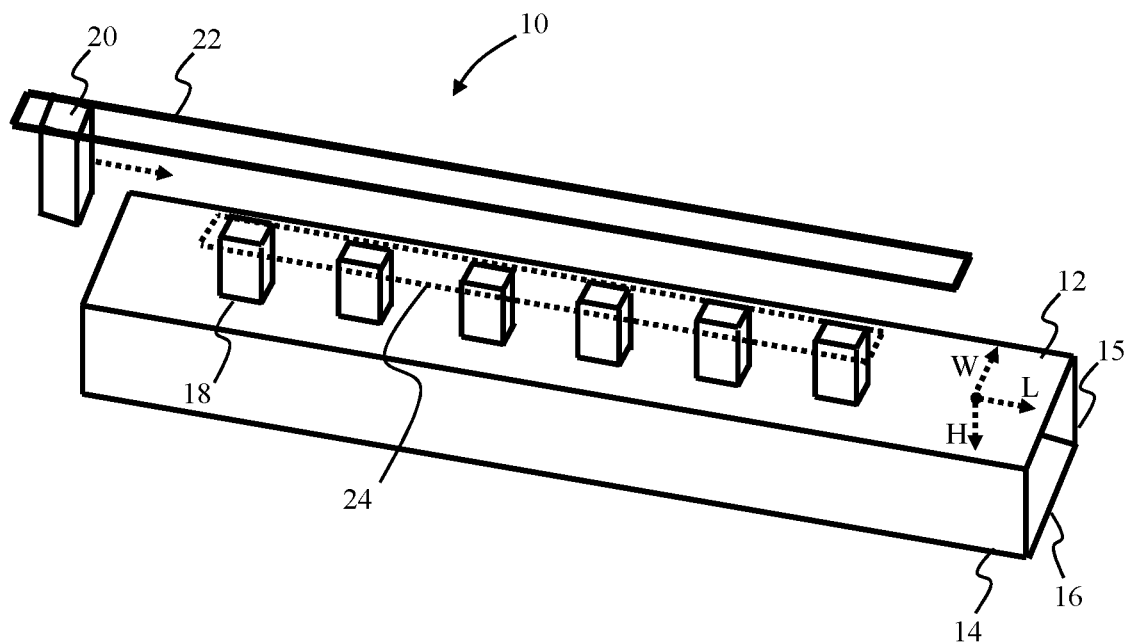
FIG. 1 schematically illustrates an example of a print bar in a finishing process.
Figure 2:
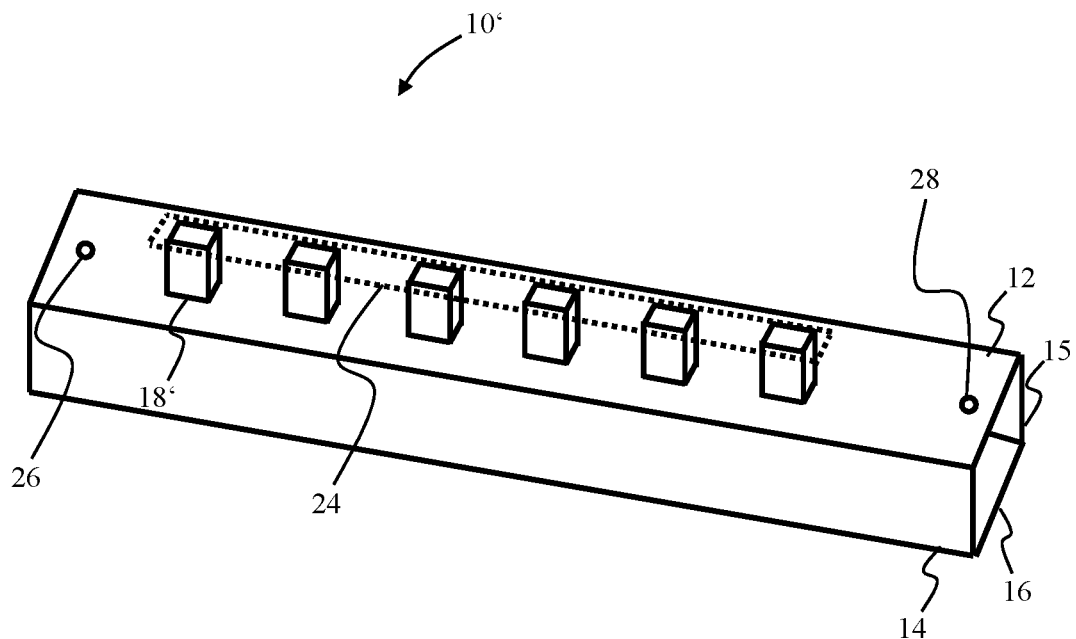
FIG. 2 schematically illustrates a finished print bar according to an example.

FIG. 1 and FIG. 2 schematically illustrate a print bar 10 in a finishing process and the finished print bar 10', respectively. The print bar 10, 10' comprises a flat elongate sheet metal portion 12. The sheet metal portion 12 has a constant height (thickness) in a height direction H. Moreover, the length of the sheet metal portion 12 in a length direction L is larger than the width of the sheet metal portion 12 in a width direction W. For instance, as shown in FIG. 1 and FIG. 2, the example sheet metal portion 12 may be substantially rectangular with a long edge that is parallel to the length direction L and a short edge that is parallel to the width direction W.

The print bar 10, 10' may further comprise a second flat elongate sheet metal portion 14 with constant height. The length of the second sheet metal portion 14 in the length direction L may be larger than its width in the direction H and its width may be larger than its height in the direction W. The print bar 10 may further comprise a third flat elongate sheet metal portion 15 with constant height. The length of the third sheet metal portion 15 in the length direction L may be larger than its width in the direction H and its width may be larger than its height in the direction W. The print bar 10 may further comprise a fourth flat elongate sheet metal portion 16 with constant height. The length of the third sheet metal portion 16 in the length direction L may be larger than its width in the direction W and its width may be larger than its height in the direction H. The length and the height of the first to fourth sheet metal portions 12, 14, 15, 16 may be identical and the first to third sheet metal portions 12, 14, 15, 16 may be formed by extrusion or bending a piece of sheet metal, e.g., a rectangular piece of sheet metal having a constant thickness. As shown in FIG. 1 and FIG. 2, the first to third sheet metal portions 12, 14, 16 may have a closed shape, such as a rectangular or a square shape when seen in the length direction L. However, the disclosure is not limited in this regard. In another example, for instance, the first and second sheet metal portions 12, 14 may have a T-shape or a V-shape when seen in the length direction. In still another example, the first to third sheet metal portions 12, 14, 15 may have a U-shape or a triangular shape when seen in the length direction L.

The print bar 10 comprises a plurality of plastic members 18 which are detachably mounted to a mounting surface of the sheet metal portion 12. The plastic members 18 may be made of a high resistance material with good milling properties such as cast polyamide. However, the plastic members 18 may also be formed of other thermoplastic materials, such as, for example, polyetylene, polypropylene, polyvinylchlorid, polystirol, styrol acrylnitril, acrylonitrile-butadiene-styrene, polyoxymethylene, polytetrafluoroethylene, fluoro ethylene-propylene, polyvinylidenefluoride, polyethylene terephthalate, polyphenylene ether, polyetheretherketone, polysulfone, polyethersulphone, polyphenylene sulphide, polymides, polyamidimide, or polyetherimide.

The mounting surface faces into a direction which is perpendicular to the length direction L and perpendicular to the width direction W. The plastic members 18 are spaced apart from each other in the length direction L. For example, the mounting surface may comprise a series of holes with internal threads to which the plastic members 18 may be screwed. Moreover, although all plastic members 18 in FIG. 1 are arranged in a row, it is noted that the invention is not limited in this regard. In another example, for instance, the plastic members 18 may be offset from each other in the width direction W with a regular offset pattern. Moreover, the mounting surface may be provided with positioning reference elements for arranging sides of the plastic member 18 along predetermined directions such as the length direction L, the width direction W, or the height direction H.

Each of the plurality of plastic members 18 serves as a base plate for a print head of a plurality of print heads. For example, each print head may be pressed against a corresponding plastic member 18. In another example, the plastic members 18 may have attachment elements to mount print heads to the plastic members 18. For instance, the attachment elements may be in the form of holes with internal threads formed in the plastic members 18. In another example, the attachment elements may be in the form of a clamp that snaps into a recess formed in the print head. In order to compensate for irregularities in the first sheet metal portion 12, the mounting surface, and the form of the plastic members 18, a milling tool 20 may mill surfaces of each of the plurality of plastic members 18. For example, the milling tool 20 may be guided along a pair of rails 22 that traverse the first sheet metal portion 12 parallel to the length direction L.

During milling, the first sheet metal portion 12 may be held in position by a support (not shown), wherein the first sheet metal portion 12 abuts on the support with surface parts that will, when mounting the print bar 10' to a printer, abut on a mounting structure of the printer. As shown in FIG. 1, the milling tool 20 may level all plastic members 18 to the same height 24 relative to the support. Thus, the surface parallel to the length direction L and the width direction W of each of the plurality of plastic members may be a milled surface. However, it is noted that the invention is not limited to milling the surface parallel to the length direction L and the width direction W. In another example, other surfaces may be milled, such as surfaces parallel to the length direction L and perpendicular to the width direction W or surfaces parallel to the width direction W and perpendicular to the length direction L. However, the contact surface between the plastic members 18 and the first sheet metal portion 12 may not be milled and thus remain in the state defined by casting the plastic members 18. Moreover, surfaces of the plastic members 18 may be milled to have a specific form that allows to align a print head mounted to the print bar 10', e.g., along the length, width, or height direction L, W, H of the first sheet metal portion 12. Each milled surface may exhibit a substantially higher degree of flatness and alignment accuracy when compared with not-milled surfaces of the plastic members 18'. For example, the dimension of alignment irregularities between milled surfaces, e.g., corresponding portions of the milled surfaces not being parallel, may be less than 10% of that of not-milled surfaces.

Figure 3:
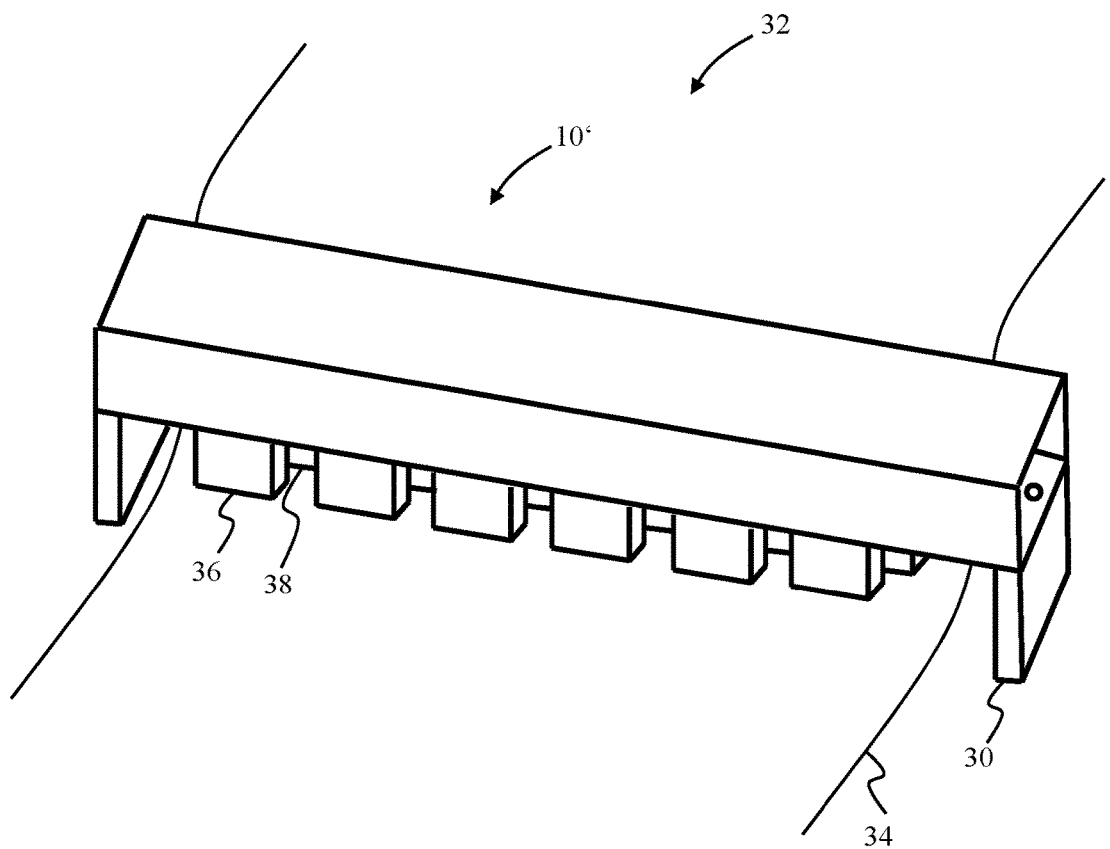
FIG. 3 schematically illustrates a printer having a mounting structure on which a finished print bar is mounted according to an example.

Before, while, or after milling the plastic members 18, the first sheet metal portion 12 may be provided with positioning reference elements to align the print bar 10' with the mounting structure of a printer. For example, the positioning reference elements may comprise holes 26, 28 with internal threads for screwing the print bar 10' to a mounting structure 30 of a printer 32 as shown in FIG. 3. Moreover, the positioning reference elements may comprise positioning pins. If the positioning reference elements are provided to the first sheet metal portion 12 before the plastic members 18 are milled, the positioning reference elements may be used to position the first sheet metal portion 12 on the support of the milling tool 20. For example, the first sheet metal portion 12 may be screwed to the support, or the positioning pins may be inserted into corresponding positioning holes in the support.

The printer 32 may be a single-pass printer that conveys a print medium 34 along a feeding path which may pass below the print bar 10' in a direction perpendicular to the length direction L of the first sheet metal portion 12. For instance, the print bar 10' may be arranged for the width direction W of the first sheet metal portion 12 to be parallel to the feeding path passing below the first sheet metal portion 12. Moreover, the print bar 10' may traverse substantially the whole width of the print medium, e.g., a web or sheets of paper or foil. The plastic members 18 may point downwards, i.e., in the vertical direction and each plastic member 18 may carry a print head 36, 38. The print heads 36, 38 may be arranged in two rows parallel to the length direction of the first sheet metal portion 12 and offset from each other in the width direction of the first sheet metal portion 12. This allows for a small overlap region between the parts of the print medium printed by the print heads 36, 38.

Figure 4:
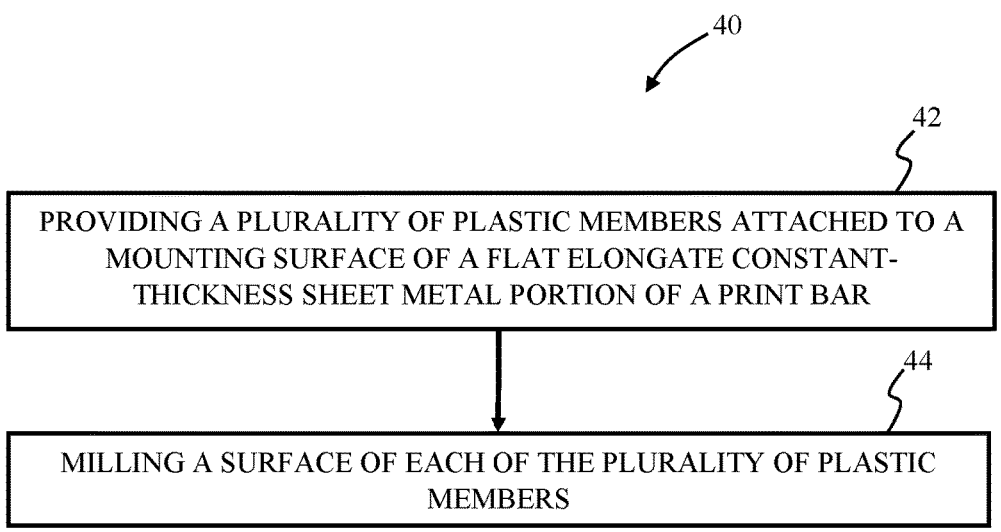
FIG. 4 is a flow diagram of a finishing process according to an example.

FIG. 4 shows a flow diagram 40 of the finishing process. The finishing process starts at 42 with attaching the plurality of plastic members 18 to the mounting surface of the first sheet metal portion 12 of the print bar 10. At 44, the process continues with milling a surface of each of the plurality of plastic members 18. After milling the surfaces, a shape of the plastic members 18 may be determined. For example, a laser scanner system may be used to scan the plastic members 18 and the scan data may be used to establish a three-dimensional model of the plastic members 18 mounted to the mounting surface. After scanning, the print bar 10' may be mounted to the mounting structure 30 of the printer 32.

When detecting that a plastic member 18 is worn out or damaged, the respective plastic member 18 may be detached from the mounting surface of the first sheet metal portion 12. In order to replace the plastic member 18 with a new plastic member, the new plastic member may be formed according to the determined shape of the plastic member 18. For example, the new plastic member may be milled from a plastic block in accordance with the determined shape. In another example, the shape of the plastic member 18 may be determined after it has been detached from the mounting surface of the first sheet metal portion 12 and the new plastic member may be formed according to the determined shape of the detached plastic member 18. In yet another example, the new plastic member may be attached to the mounting surface of the first sheet metal portion 12 and a corresponding surface of each of the plurality of plastic members attached to the mounting surface may be milled as described above with reference to FIG. 1. In either case, the replacement of worn out or damaged print head base plates (plastic members 18) allows avoiding replacement of the whole print bar 10' and thus greatly reduces the maintenance effort.

The invention claimed is:

1. A print bar, comprising:
   a reference element to align the print bar with a mounting structure of a printer;
   a flat elongate sheet metal portion with constant height whose length is larger than its width and whose width is larger than its height; and
   a plurality of plastic members detachably mounted to a mounting surface of the flat elongate sheet metal portion, the plurality of plastic members being spaced apart from each other in the length direction,
   wherein the flat elongate sheet metal portion is a first flat elongate sheet metal portion and the print bar further comprises a second flat elongate sheet metal portion with constant height whose length is larger than its width and whose width is larger than its height, wherein the length directions of the first and the second sheet metal portions are parallel and where the width directions of the first and the second sheet metal portions are perpendicular.

2. The print bar of claim 1, wherein each of the plurality of plastic members comprises a milled surface.

3. The print bar of claim 1, wherein the print bar further comprises a third flat elongate sheet metal portion with constant height whose length is larger than its width and whose width is larger than its height, wherein the length directions of the first and the third sheet metal portions are parallel and where the width directions of the first and the third sheet metal portions are perpendicular and wherein the first to third sheet metal portions form a U-shape when seen in the length direction.

4. A single-pass printer comprising:
   a mounting structure; and
   a print bar mounted to the mounting structure, the print bar comprising: a reference element to align the print bar with the mounting structure; a flat elongate sheet metal portion with constant height whose length is larger than its width and whose width is larger than its height; and
   a plurality of plastic members detachably mounted to a mounting surface of the flat elongate sheet metal portion, the mounting surface facing into a direction which is perpendicular to the length direction of the flat elongate sheet metal portion,
   wherein the plurality of plastic members being spaced apart from each other in the length direction, wherein the length direction of the flat elongate sheet metal portion is perpendicular to a print medium feeding path passing below the flat elongate sheet metal portion, and
   wherein the flat elongate sheet metal portion is a first flat elongate sheet metal portion and the print bar further comprises a second flat elongate sheet metal portion with constant height whose length is larger than its width and whose width is larger than its height, wherein the length directions of the first and the second sheet metal portions are parallel and where the width directions of the first and the second sheet metal portions are perpendicular.

5. The printer of claim 4, wherein a print head is pressed against a plastic member of the plurality of plastic members.

6. A method, comprising:
providing a plurality of plastic members attached to a mounting surface of a flat elongate constant-thickness sheet metal portion of a print bar, the sheet metal portion having a length which is larger than a width of the sheet metal portion, wherein the width is larger than the height of the sheet metal portion;
milling a surface of each of the plurality of plastic members
detaching a plastic member of the plurality of plastic members from the mounting surface; and
replacing the plastic member with a new plastic member.

7. The method of claim 6, further comprising:
mounting the print bar to a mounting structure of a single-pass printer.

8. The method of claim 6, further comprising:
milling a surface of each of the plurality of plastic members attached to the mounting surface after replacing the plastic member with the new plastic member.

9. The method of claim 6, further comprising:
detaching, after milling the surface of each of the plurality of plastic members and before replacing the plastic member with the new plastic member, the plastic member from the mounting surface;
determining a shape of the plastic member; and
re-attaching the plastic member to the mounting surface.

10. The method of claim 9, further comprising:
forming the new plastic member according to the determined shape of the plastic member.

11. The method of claim 6, wherein the print bar comprises a reference element to align the print bar with a mounting structure of a single-pass printer.

12. The method of claim 6, wherein the flat elongate sheet metal portion is a first flat elongate sheet metal portion and the method further comprises providing the print bar which further comprises a second flat elongate sheet metal portion with constant height whose length is larger than its width and whose width is larger than its height, wherein the length directions of the first and the second sheet metal portions are parallel and where the width directions of the first and the second sheet metal portions are perpendicular.

13. The method of claim 12, wherein providing the print bar further comprises providing the print bar which further comprises a third flat elongate sheet metal portion with constant height whose length is larger than its width and whose width is larger than its height, wherein the length directions of the first and the third sheet metal portions are parallel and where the width directions of the first and the third sheet metal portions are perpendicular and wherein the first to third sheet metal portions form a U-shape when seen in the length direction.

* * * * *

UNITED STATES PATENT AND TRADEMARK OFFICE
CERTIFICATE OF CORRECTION

PATENT NO.         : 10,391,771 B2
APPLICATION NO.    : 15/748567
DATED              : August 27, 2019
INVENTOR(S)        : Joaquim Brugue Garvi et al.

It is certified that error appears in the above-identified patent and that said Letters Patent is hereby corrected as shown below:

On the Title Page

Item (71), Applicants, Lines 3-9, after "Hewlett-Packard Development Company, L. P., Houston, TX (US);" delete "Joaquim Brugue Garvi, Sant Cugat del Valles (ES); Rafael Ulacia Portoles, Sant Cugat del Valles (ES); Daniel Gonzalez Perello, Sant Cugat del Valles (ES); Eduardo Ruiz Martinez, Sant Cugat del Valles (ES); Francese Roure Pastor, Sant Cugat del Valles (ES)".

In the Claims

In Column 5, Line 14, in Claim 6, delete "members" and insert -- members; --, therefor.

Signed and Sealed this
Twenty-fourth Day of December, 2019

Andrei Iancu
*Director of the United States Patent and Trademark Office*